United States Patent [19]
Berger

[11] Patent Number: 5,842,384
[45] Date of Patent: Dec. 1, 1998

[54] SHIFT INHIBITOR

[75] Inventor: Allan H. Berger, Houston, Tex.

[73] Assignee: Safety Systems & Controls, Inc., Houston, Tex.

[21] Appl. No.: 399,151

[22] Filed: Mar. 1, 1995

[51] Int. Cl.$^6$ ............................ G05G 5/08; B60K 41/04; B60K 41/26

[52] U.S. Cl. ................. 74/529; 192/4 A; 477/96

[58] Field of Search .................. 192/4 A, 4 C, 192/9; 477/99, 96; 74/529, 540, 475, 483 R

[56] References Cited

U.S. PATENT DOCUMENTS

| | | | |
|---|---|---|---|
| 1,584,013 | 5/1926 | Collins | 74/540 |
| 1,629,666 | 5/1927 | Keeler | 74/475 |
| 3,054,302 | 9/1962 | Cone | 74/475 |
| 4,349,089 | 9/1982 | Finney | 192/4 A |
| 4,507,736 | 3/1985 | Klatt | 74/475 X |
| 4,631,984 | 12/1986 | Jones | 74/483 R X |
| 4,646,582 | 3/1987 | Kijima | 74/475 X |
| 4,917,224 | 4/1990 | Gokee | 192/4 A |
| 4,942,949 | 7/1990 | Dai | 74/512 X |
| 4,966,262 | 10/1990 | Mieczkowski | 477/99 X |

OTHER PUBLICATIONS

Shift Shock Stop, Safety Systems & Controls, Inc., 1994 (co-owned with present invention/application).
Patents Official Gazette entry for U.S. 5,383,379; 24 Jan. 95.
Patents Official Gazette entry for U.S. 5,388,476; 14 Feb. 95.
Patents Official Gazette entry for U.S. 5,388,477; 14 Feb. 95.
Patents Official Gazette entry for U.S. 5,398,532; 21 Mar. 95.
Patents Official Gazette entry for U.S. D 356,487; 21 Mar. 95.
Patents Official Gazette entry for U.S. 5,398,565; 21 Mar. 95.
Patents Official Gazette entry for U.S. 5,400,627; 28, Mar. 95.
Patents Official Gazette entry for U.S. 5,400,673; 28 Mar. 95.

*Primary Examiner*—Rodney H. Bonck
*Attorney, Agent, or Firm*—Guy McClung

[57] ABSTRACT

The present invention, in certain embodiments, discloses a vehicle transmission system having a typical transmission with associated transmission shifting apparatus that includes gears and a manually-operated gear selection apparatus. Such gear selection apparatus includes a transmission selector shaft interconnected between a shifting handle or rod in the vehicle's cab and internal gearing within the transmission. Manual manipulation of the cab-mounted handle or rod moves the transmission selector shaft whose movement in turn results in a gear change. The transmission includes a locking system according to the present invention with a swing arm secured to the transmission selector shaft with an upper surface having a window therethrough or stop thereon. In one embodiment the upper surface is curved to facilitate its movement with respect to a selective locking mechanism which has a locking rod movable into the window or against the stop to prevent movement of the transmission selector shaft—thereby preventing shifting of the transmission—and movable from the window or past the stop to again permit movement of the transmission selector shaft and shifting of the transmission. In one aspect one stop or two spaced-apart stops are used on the upper surface to abut the locking rod to prevent shifting.

12 Claims, 6 Drawing Sheets

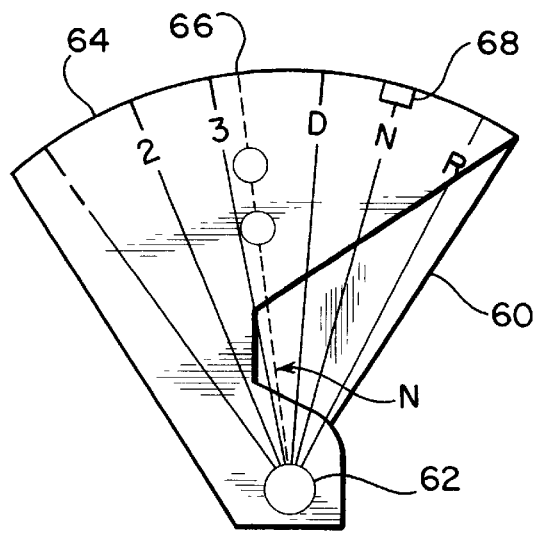
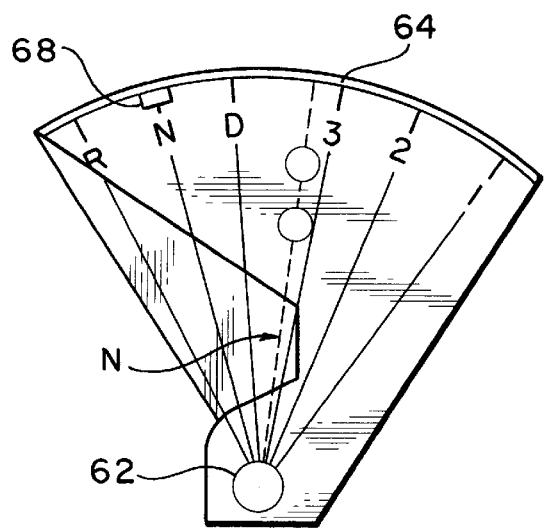
FIG. 4A            FIG. 4B
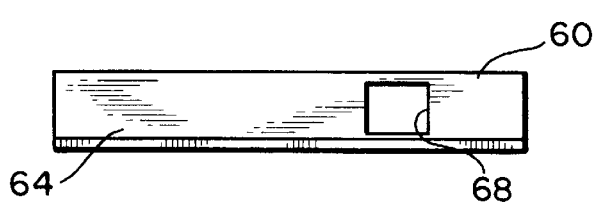
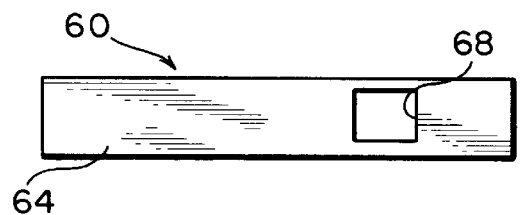
FIG. 4C            FIG. 4D
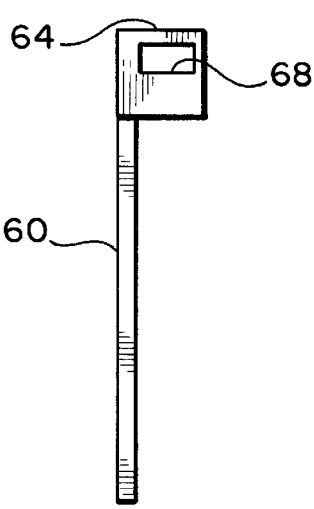
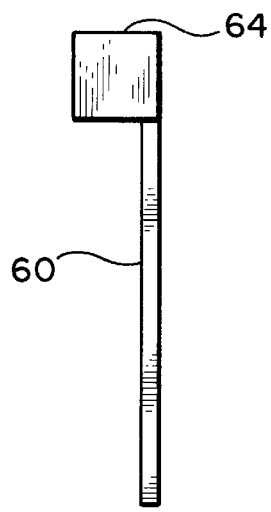
FIG. 4E            FIG. 4F

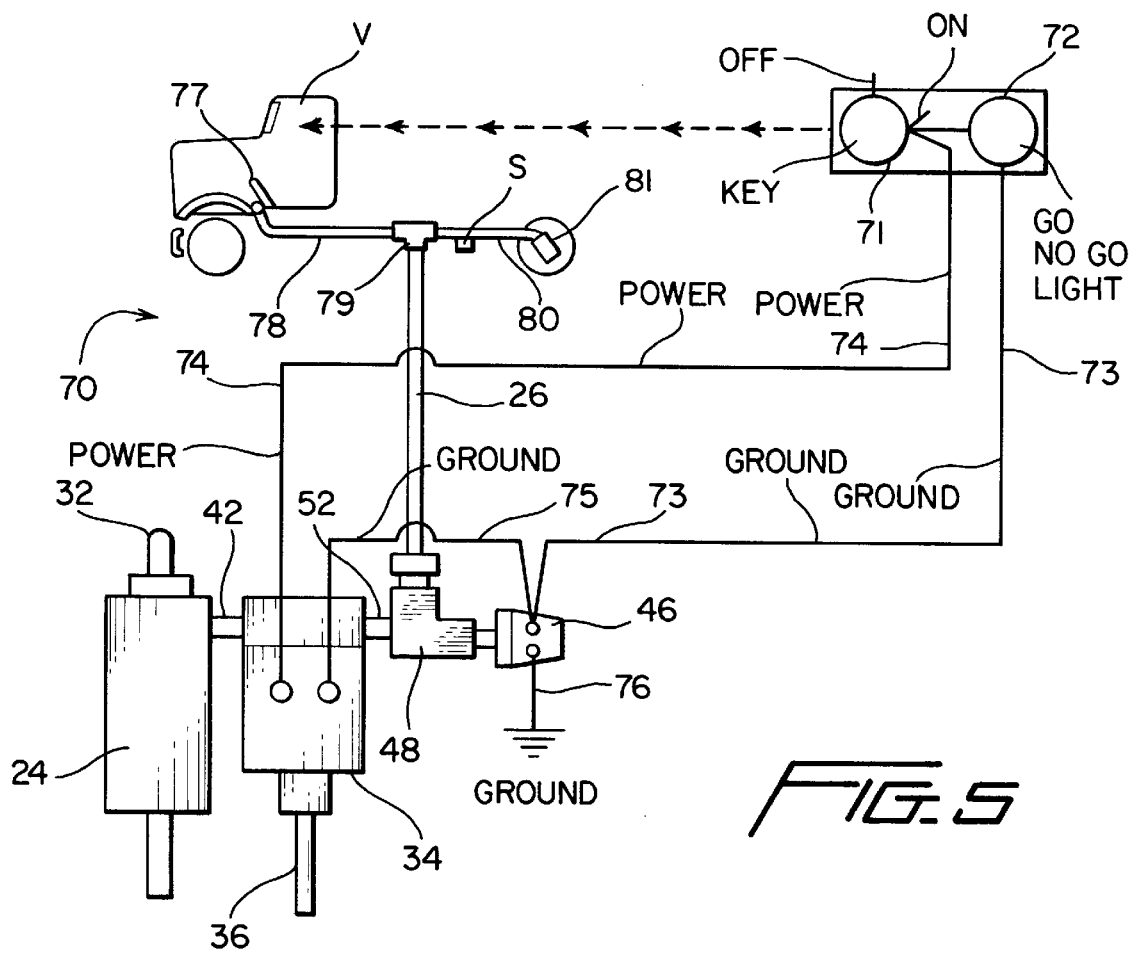
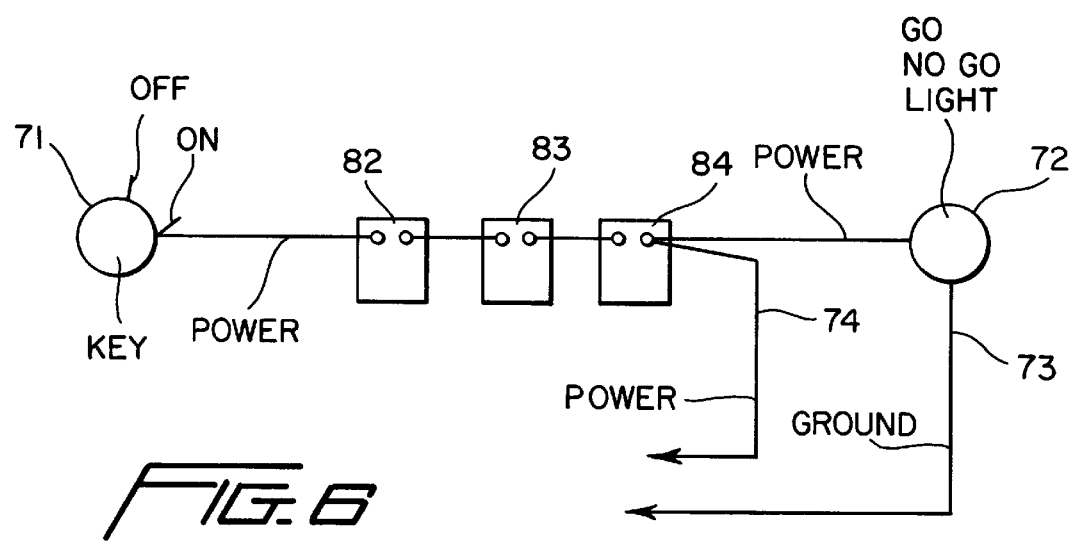

SHIFT INHIBITOR

BACKGROUND OF THE INVENTION

1. Field of the Invention

This invention is directed generally to transmissions of operated vehicles and, in certain aspects, to systems to prevent improper use of an automatic transmission.

2. Description of Related Art

Mechanical damage to automatic transmissions, drive lines and drive axles of vehicles is a common and costly problem, particularly in vehicles operated by lower skilled workers and/or operated in time sensitive situations requiring high productivity. "Vehicle" includes any mobile equipment, whether self-powered or not, including but not limited to: trucks; truck tractors; buses; vans; mini-vans; tow tugs; fork lift trucks; construction equipment; boats; conveyor equipment; timber industry equipment; mining equipment; farming equipment; oil and gas drilling equipment; railroad equipment; and waste industry equipment. In addition to mechanical damage, a safety problem is known to exist with automatic transmissions. Commercial vehicle engines frequently are left running while the vehicle is left unattended, i.e., the operator is not at the vehicle's controls. A potential safety and liability condition exists if the transmission gear selector linkage vibrates out of a neutral position and into a vehicle drive gear. An additional potential safety and liability condition exists if an unauthorized person moves the transmission gear selector out of the neutral position into a vehicle drive gear or a power-take-off (PTO) gear. For example, school bus drivers frequently are required to leave the driver's seat, exit the bus and assist persons into or out of the bus or children crossing the street. If the bus is used for transporting handicapped persons, the driver may be required to operate a vehicle wheel lift system and assist the person to and from a residence. Heating, air conditioning and electrical load demands on the vehicle frequently require that the bus engine remain running so as not to run down the vehicle's battery.

A potential and serious safety problem exists because a person or child within the bus can easily shift the transmission gear selector out of neutral and into gear. A person in the driver's seat can push down on the accelerator and begin moving the bus. Exceptional skills are not required to be able to shift the transmission into gear, release the parking/holding brake, step on the accelerator, and begin moving the bus.

While many of the automobile manufacturers recently have begun providing as standard equipment an automatic transmission control system that prevents a driver from shifting out of a PARK position unless he or she is stepping on the brake pedal, these systems do not recognize or address problems associated with the unwanted shifting of an automatic transmission from out of neutral and into any drive or PTO gear if the axle drive gears are moving.

One prior art system for locking a transmission on a vehicle with air brakes is known as the "Shift Shock Stop" system co-owned with the present invention. This system has a winged swing arm secured to a transmission selector shaft and an air-actuated cylinder with a movable spring-loaded detent button within a cylinder rod mounted so that the button projects horizontally into and out of a hole in the winged swing arm. The detent button contacts the winged swing arm only on either side of a location corresponding to the transmission being in a "Neutral" status; and does not touch the swing arm when the transmission is in a drive gear. The detent button assembly is mounted to the cylinder and held extended by an internal spring within the cylinder. Application of appropriate air pressure to the cylinder overcomes the cylinder spring and results in the detent assembly in toto being withdrawn into the cylinder.

Many prior art devices focus on preventing a driver from shifting an automatic transmission out of a PARK position; but many automatic transmissions used in commercial applications do not have a PARK position.

SUMMARY OF THE PRESENT INVENTION

The present invention, in certain embodiments, discloses a vehicle transmission, system having a typical transmission with associated transmission shifting apparatus that includes gears and a manually-operated gear selection apparatus. Such gear selection apparatus includes a transmission selector shaft interconnected between a shifting handle in the vehicle's cab and internal gearing within the transmission. Manual manipulation of the cab-mounted handle moves the transmission selector shaft whose movement in turn results in a gear change. The transmission includes a locking system according to the present invention with a swing arm with an upper surface having a window therethrough secured to the transmission selector shaft. In one embodiment the upper surface is curved to facilitate its movement with respect to a selective locking mechanism which has a locking rod movable into the window to prevent movement of the transmission selector shaft—thereby preventing shifting of the transmission—and movable from the window to again permit movement of the transmission selector shaft and shifting of the transmission. In one aspect one stop member or two spaced-apart stops are used on the upper surface instead of a window and it is within this invention's scope to use any structure which will releasably hold and/or stop the rod.

The selective locking mechanism, in certain embodiments, includes a solenoid-activated locking rod which is initially, preferably, pre-loaded by a spring urging it outwardly from a cylindrical body holding the solenoid actuation apparatus and the locking rod. Prior to entering the window, the locking rod bears against the upper surface of the swing arm as the swing arm moves beneath the locking rod as the transmission selector shaft moves. The window is located so that when the transmission selector shaft is moved to place the transmission in neutral, the pre-loaded locking rod enters the window. This locks the swing arm and the transmission selector shaft in place and, therefore, locks the transmission in neutral.

To again shift the transmission, the locking rod is removed from the window by the action of the solenoid apparatus. This can be accomplished by sending any desired signal or series of signals to the solenoid actuator apparatus. When the actuator is a rod-type solenoid actuator, the in-and-out movement of the locking rod is controlled by energizing (in) or de-energizing (out) a solenoid coil surrounding the locking rod. One or more electrical devices are interconnected with the solenoid power supply. The or each of them must be "ON" or closed before power flows to the solenoid coil, energizing it, retracting the locking rod from the window, and permitting movement of the transmission selector shaft to shift from neutral to a forward or reverse gear. A GO/NO GO light, e.g. a light which turns green in a GO situation, may be interconnected with the solenoid power circuit to give a visual indication that the locking rod has been retracted from the window and the transmission can be shifted from neutral.

In one embodiment, the present invention discloses a swing arm for indicating which gear a transmission is in and/or for use with a transmission as described above or with a transmission locking system according to the present invention as described above. In certain embodiments, the swing arm has a main body generally shaped like a piece of pie when viewed from above with a smaller pointed end for securement to a transmission selector shaft and a wider upper end arc on which indicating indicia may be placed corresponding to each gear and position of the transmission. Secured to or formed integrally of the wider upper end arc is an upper surface member generally at a right angle at any given point to the main body. The swing arm rotates through an arc below the locking rod as the selector shaft is moved. In one embodiment the swing arm has an integral collar with a keyway that slides over and mates with a key on the transmission cable control shaft. (For example, the threaded selector shaft on Allison transmissions is shaped with two flat sides and an arm hole for a swing arm may be shaped correspondingly to mate with the shape of the selector shaft.) When the collar is secured, the arm moves with the bracketing which is connected to the internal gearing of the transmission at the selector shaft. When the bracketing is moved by the gear selector cable or rod, everything moves as a unit including the swing arm. When disposed adjacent or beneath an indicator and/or locking rod, in certain embodiments the position of the rod above indicia on the swing arm indicates what gear the transmission is in; e.g. a main body may bear the indicia "1" "2" and "3" to indicate first, second, and third gears respectively; "D" to indicate a fourth forward drive gear; "N" to indicate a neutral transmission position, and "R" to indicate a reverse gear. If the rod is above the "R" indicia, this visually indicates that the transmission is in reverse. For simple status indication, the main body alone suffices, the upper surface is superfluous, and any indicator, not only a locking rod, can indicate transmission status. When the swing arm is also used with a transmission locking system, the upper surface member has a window in it corresponding to the gear or position in which locking of the transmission is desired, e.g. neutral, reverse, etc. By using an appropriate raised portion on the upper member, movement of the rod to a certain gear location is prevented; i.e. the transmission is prohibited from entering a certain gear e.g. third, reverse, etc.

In certain embodiments of such a swing arm, a solenoid apparatus is used with a spring-loaded pre-loaded locking rod with sufficient range of motion to allow the locking rod to move up and down on the upper surface member past and through the various gear indicating positions. Preferably the solenoid apparatus and locking rod and its cylinder are adjustably securable to the transmission, e.g. on a bracket with multiple holes sized for adjustment, so that the locking rod is properly positioned with respect to the upper surface member. Alternatively, the main body member may have ramped stop members on a front or rear surface thereof so that when the locking rod is positioned between two stop members, the swing arm cannot move [e.g. ramped on an entry side, but squared off for sides abutting the locking rod to prevent movement]. If only prevention of shifting into a forward drive gear is desired, only one stop member is needed; similarly if only prevention of shifting into reverse is desired, only one stop member is needed.

A transmission or transmission locking system according to the present invention may be provided in one of a variety of configurations relying on a variety of signal types; e.g. pneumatic, pneumatic and electric, hydraulic, hydraulic and electric, electric, or pneumatic-hydraulic-electric.

In certain embodiments of the present invention described above in pneumatic or hydraulic configurations, the solenoid valve (e.g. solenoid 34) is a commercially available normally-closed three-way type valve with a properly sized flow coefficient factor for allowing rapid applied pressure and exhaust discharge of air or highly viscous oil or fuel. The cylinder (e.g. cylinder 24) is a commercially available normally extended one-way type with internal components designed for use in both pneumatic and hydraulic service. The rod slides across the swing arm face and extends and locks into the swing arm window or stop space when the transmission is in a desired gear or neutral position. When the curved locking swing arm contacts the cylinder rod, the rod is held fully retracted from the load placed upon it by the arm. The cylinder support and mounting allow mounting and support of the solenoid; prevent rotation of the cylinder and solenoid; allow filtering and venting of air from an exhaust side of the cylinder; protect the cylinder from external damage; and allow adjustment and positioning of the solenoid, cylinder and rod against the swing arm.

The cylinder support is secured at both its head and tail end and is adjustable in horizontal, vertical, forward and away positioning against the swing arm. The curved swing arm keeps the cylinder rod pre-loaded when the transmission selector shaft is positioned in any gear except neutral (when the window is located at a neutral position and locking in neutral is desired). The hoses, tubing and fittings differ between pneumatic and hydraulic configurations.

In certain embodiments, the configuration has a single air supply hose or tubing connected from a tee in the brake air application plumbing to the solenoid valve inlet. The exhaust port of the solenoid valve vents to atmosphere. In addition, the solenoid valve may be integrally connected to the cylinder or remotely mounted away from the cylinder, but connected with a single supply hose or tubing.

In certain embodiments the configuration is designed with a single pressurized fluid (e.g. engine oil or fuel) supply hose or tubing connected from a pressurized engine oil or fuel supply port to a tee at the solenoid inlet. An orifice and by-pass line connect from a tee at the solenoid valve inlet to a tee at the solenoid exhaust port. An oil or fuel return hose or tubing is connected from the solenoid exhaust tee to an oil port or fuel port at the engine, an engine component or an engine accessory. Oil or fuel venting out of the solenoid exhaust port flows into the oil or fuel return hose or tubing. Oil or fuel flowing through an orifice by-pass line into the solenoid exhaust port tee and then into the oil or fuel return hose or tubing results in continuous warm oil or fuel at the solenoid valve inlet and exhaust ports and within the cylinder when the solenoid is energized. In addition, the solenoid valve may be integrally connected to the cylinder or remotely mounted away from the cylinder, but connected with a single oil or fuel supply hose or tubing. Vehicles with pneumatic and/or hydraulic brakes may be equipped with a version of the invention designed to operate with electric or electronic components and without pneumatic or hydraulic cylinders.

In certain embodiments the electrical components differ between pneumatic and hydraulic configurations and also differ from configurations that do not utilize pneumatic or hydraulic cylinders. Whereas in certain embodiments a break electrical power system is utilized rather than a break electrical ground system, it is within the scope of this invention for the electrical system to be designed and wired so that the following references to making and breaking electrical ground can be reversed with reference to making and breaking electrical power.

In one aspect, the pneumatic configuration includes a pneumatic cylinder that utilizes a normally opened pressure switch to sense brake air application pressure. The solenoid valve, dash indicator light and/or audible signal are powered electrically whenever an ignition key is in the ON position, but are grounded when the normally opened pressure switch closes and completes the ground. When the specified amount of brake air application pressure is applied to the switch, the switch closes and completes the ground to both the normally closed solenoid valve and the dash indicator light and/or audible signal. When the solenoid valve becomes grounded by the pressure switch, the solenoid opens and allows available brake air application pressure at the solenoid inlet to travel through the solenoid and into the cylinder. The pressurized air within the cylinder retracts the locking rod to unlock the extended rod from the swing arm window for uninhibited movement of the transmission shift linkage or to allow the swing arm to move past the retracted locking rod without locking. When the brake air application pressure at the air pressure switch drops below the specified minimum required to keep the switch closed, the solenoid ground is interrupted. The solenoid valve then closes off the inlet supply of air and allows the air from within the cylinder to exhaust through the solenoid exhaust port. The dash light and/or audible signal also deactivate when the air pressure falls below the minimum required to maintain completion of the electrical ground at the air pressure switch. Without adequate air pressure to keep the solenoid valve grounded and fully opened and the rod fully retracted, the spring loaded locking rod instantly extends to a full OUT position. For moving vehicle protection, electrical power to the solenoid valve dash indicator light and/or audible signal is uninterrupted whenever the key is in the ON position. Activation of the solenoid valve, dash indicator light and/or audible signal is tied to grounding of these components through the brake air application pressure switch.

In certain embodiments, in which more than moving vehicle protection is a part of the system, electrical power to the solenoid valve, dash light and/or audible signal is wired in series through one or more signal devices and/or switches. These devices and/or switches allow uninterrupted electrical flow to the solenoid valve when sensing that an acceptable parameter conditions exist. Should an unacceptable condition exist, (one that might prove to be detrimental for mechanical or safety reasons should the transmission be able to be shifted out of or through neutral) these devices and/or switches interrupt electrical flow to the solenoid valve. Air flow through the solenoid valve and into the cylinder and the extended or retracted position of the locking rod therefore are controlled by the electrical power and/or ground conditions at the solenoid valve.

In certain embodiments with an hydraulic configuration, a hydraulic cylinder utilizes an electrical device and/or switch to determine: the mechanical position of the brake pedal; or the lack of rotation of the drive line; or the lack of rotation of a drive wheels; or the lack of speedometer movement; or the hydraulic pressure of hydraulic fluid in the hydraulic brake system; or other vehicle motion sensing devices to determine when the vehicle's power train is stopped or virtually stopped. When no or essentially no movement of the power train is sensed, electrical power or ground flows uninterrupted to the solenoid, dash indicator light and/or audible signal. The solenoid then opens and allows available pressurized oil or fuel at the solenoid inlet to travel through the solenoid and into the cylinder. The pressurized oil or fuel within the cylinder retracts the locking rod to unlock it from the swing arm window for uninhibited movement of transmission shift linkage or to allow the swing arm to move past the retracted locking rod without locking. When one or more of the vehicle movement sensing devices senses power train movement, the electrical power or ground signal through the series of devices to the solenoid valve is interrupted, the solenoid valve inlet supply port closes and all oil or fuel from within the cylinder evacuates through the solenoid exhaust port into an oil or fuel return line. The dash light and/or audible signal also deactivate when electrical power or ground through one or more of the devices is interrupted. When the transmission is in the gear corresponding to the window, the spring loaded locking rod instantly extends to a full OUT position.

In certain embodiments in which more than moving vehicle protection is a part of the system control of engine speed, driver body position, parking brake position, electrical power or ground to the solenoid valve, dash light and/or audible signal is wired in series through one or more signal devices and/or switches. These devices and/or switches are designed to allow uninterrupted electrical power or ground to flow to the solenoid valve when sensing that acceptable parameter conditions exist. Should an unacceptable condition exist, one that would be detrimental for mechanical or safety reasons if the transmission is shifted out of or through neutral, these devices and/or switches interrupt electrical flow to the solenoid valve. Pressurized fluid flow (e.g. oil, fuel, hydraulic fluid) through the solenoid valve and into the cylinder and the extended or retracted position of the locking rod are controlled by the electrical power and/or ground conditions at the solenoid and by the position of the rod relative to the window.

In certain embodiments with electrical/electronic configurations, according to the present invention, the solenoid valve is a commercially available normally extended rod type with a spring extended rod that fully retracts when a solenoid valve coil is energized to move a locking rod therein (i.e. in these embodiments there is no solenoid valve separate and apart from a cylinder with a rod movable therein). A solenoid mounting bracket secures the solenoid; provides ease of installation of the solenoid to a transmission mounting bracket; and appropriately oversized mounting holes and appropriately sized bolts and nuts allow horizontal, vertical, forward and away positioning of the solenoid against and with respect to the swing arm. Transmission mounting brackets are designed to support and allow positioning of the solenoid mounting bracket assembly and one or more devices for sensing one or more mechanical positions of the swing arm. The swing arm is aligned with the transmission selector shaft and is rotatable when the transmission selector shaft is rotated. The arm is designed with an open window or stop space into which the locking rod extends and locks when the rod is fully extended and the arm is at the neutral position. When a curved swing arm is used, it keeps the locking rod pre-loaded against its upper surface when the transmission selector shaft is positioned in any gear except neutral. In an electric/electronic configuration an electrical device or switch determines: the mechanical position of the brake pedal; or the lack of rotation of the drive line; or the lack of rotation of a drive wheels; or the lack of speedometer movement; or the hydraulic pressure in the hydraulic brake system; or the status of other vehicle motion sensing devices to determine when the vehicle's power train is stopped or virtually stopped. When no or essentially no movement of the power train is sensed, electrical power or ground flows uninterrupted to the solenoid, dash indicator light and/or audible signal. The locking rod then immediately retracts fully to unlock it from the swing arm window for uninhibited movement of transmission shift linkage or to allow the swing arm to move past the retracted rod without locking.

When one or more of the vehicle movement sensing devices senses power train movement, the electrical power or ground signal through the series of devices to the solenoid is interrupted. The dash light and/or audible signal deactivates when electrical power or ground through one or more of the devices is interrupted. When the transmission is in the gear corresponding to the window, the spring loaded rod instantly extends to a full OUT position.

In certain embodiments in which more than moving vehicle protection is a part of the system, electrical power or ground to the solenoid, dash light and/or audible signal is wired in series through one or more signal devices and/or switches. These devices and/or switches allow uninterrupted electrical power or ground to flow to the solenoid when sensing that acceptable parameter conditions exist. Should an unacceptable condition exist, one that would be detrimental for mechanical or safety reasons if the transmission is able to be shifted out of or through neutral, these devices and/or switches interrupt electrical flow to the solenoid. The extended or retracted position of the rod is controlled by the electrical power and/or ground conditions at the solenoid and by the position of the rod relative to the window.

The present invention discloses a transmission system for a vehicle having a cab, the transmission system comprising a case, internal vehicle gearing with multiple gears mounted in the case, manually-operable gear selection apparatus including a selector shaft connected to a rod, a shifting handle in the cab connected to the rod, a transmission locking system, the transmission locking system according to this invention having a swing arm secured to the transmission selector shaft and movable therewith, locking apparatus with a movable locking rod disposed above the swing arm, capture apparatus on the swing arm for receiving and releasably holding the movable locking rod thereby preventing further movement of the swing arm so that the transmission selector shaft is immobilized and further shifting of the transmission is prevented, and the movable locking rod movable with respect to the capture apparatus.

It is, therefore, an object of at least certain preferred embodiments of the present invention to provide:

New, useful, unique, efficient, safe, nonobvious transmissions and transmission locking systems;

Such transmissions and locking systems with a movable locking rod which moves to hold a swing arm to prevent gear shifting;

Such swing arms having an upper surface with a window therein or stop(s) thereon for receiving and holding the locking rod to prevent gear shifting;

Such devices that provide an automatic transmission shift inhibitor system that is easily adaptable to vehicles with pneumatic, hydraulic, or electrical/electronic brakes;

Such devices that provide an automatic transmission shift inhibitor system that is easily and simply deactivated without the removal of any components if an authorized person desires to have uninhibited use of the transmission without activation of the shift inhibitor;

Such devices that provide an automatic transmission shift inhibitor system that is easily removed and remounted on one or more transmission models from one or more transmission manufacturers with a minimum change of bracketry and hardware;

Such devices that provide an automatic transmission shift inhibitor system that activates or deactivates or controls or decontrols one or more mechanical, electrical, electrical/ mechanical or electronically sensed devises by sensing the mechanical position of the locking swing arm; and A swing arm for indicating transmission status and/or for use with locking systems as described or claimed herein.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 4A is a front view of a swing arm for a transmission locking system according to the present invention. FIG. 4B is a rear view of the arm of FIG. 4A. FIG. 4C is a bottom view of the arm of FIG. 4A. FIG. 4D is a top view of the arm of FIG. 4A. FIG. 4E is a left side view of the arm of FIG. 4A. FIG. 4F is a right side view of the arm of FIG. 4A.

FIG. 5 is a schematic view of a pneumatic actuating system according to the present invention.

FIG. 6 is a schematic view of a pneumatic actuating system according to the present invention.

DESCRIPTION OF EMBODIMENTS PREFERRED AT THE TIME OF FILING FOR THIS PATENT

Figure 1:
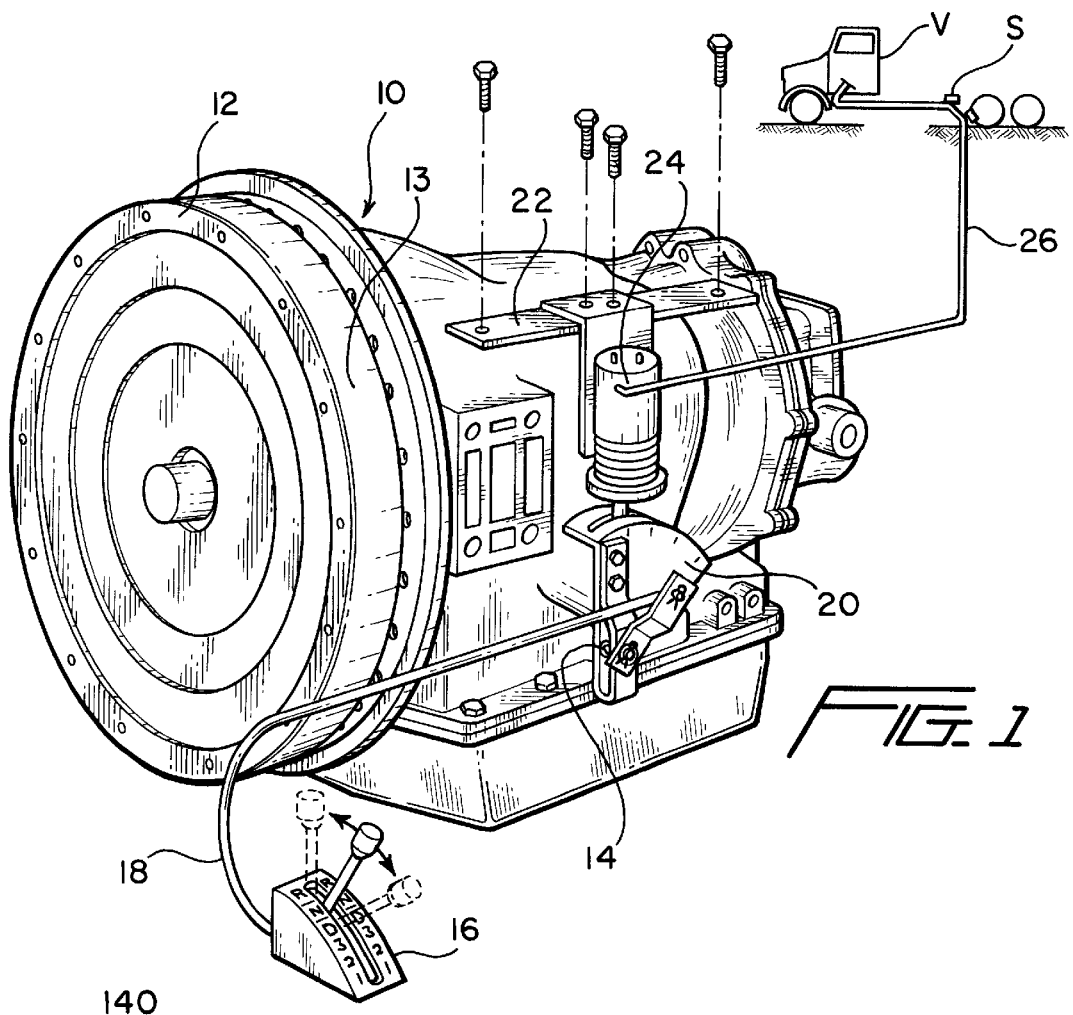
FIG. 1 is a side perspective view of a transmission according to the present invention with a transmission locking system according to the present invention.

Referring now to FIG. 1, a transmission 10 according to the present invention has a typical conventional prior art outer case 12 with typical conventional prior art internal gears and mechanisms 13 (shown in dotted lines); a transmission selector shaft 14; a gear selector 16 interconnected with the transmission selector shaft 14 by a cable 18; a status-indicating swing arm 20 secured to the selector shaft 14; a mounting plate 22 secured to the case 12; a locking cylinder 24 secured to the plate 22; and a power line 26 interconnected between the locking cylinder 24 and a power source S of a vehicle V. Movement of the gear selector 16 moves the cable 18, moving the selector shaft 14.

Figure 2:
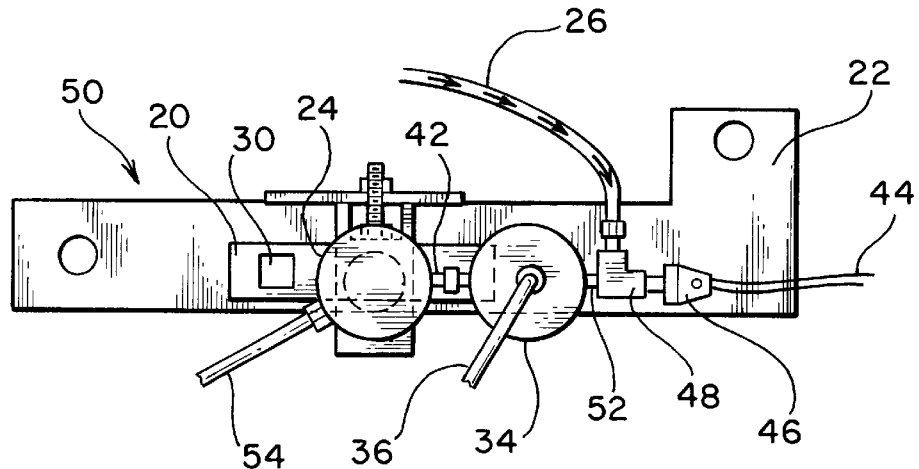
FIG. 2 is a top schematic view of a transmission locking system according to the present invention.
Figure 3:
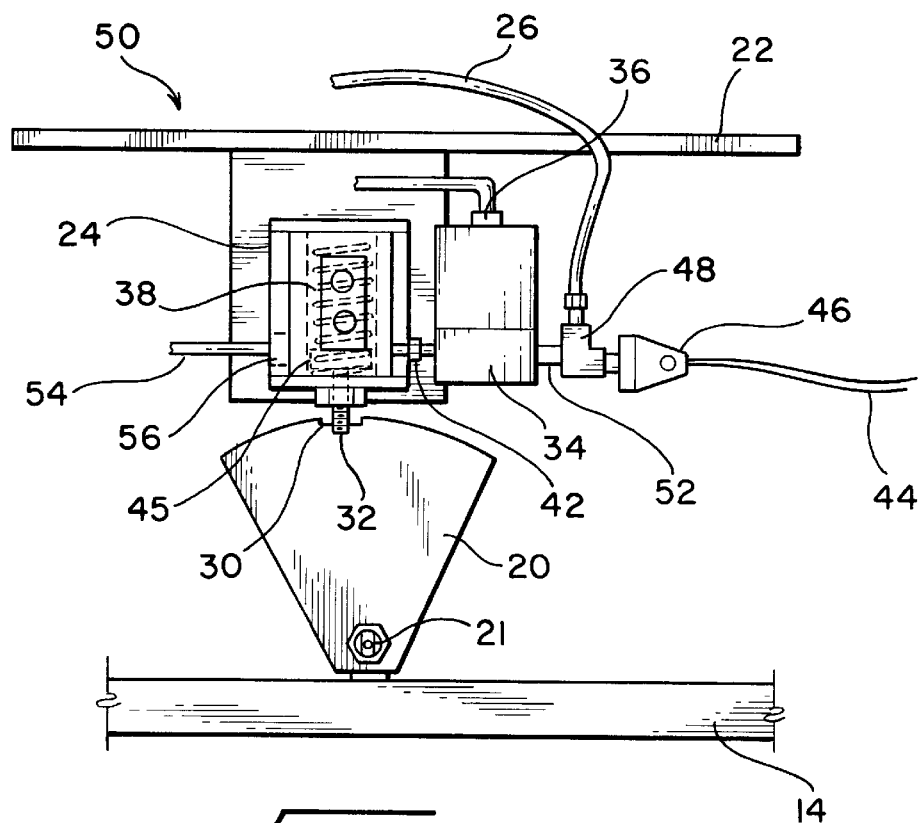
FIG. 3 is a front view of the system of FIG. 2.

FIGS. 2 and 3 show a transmission locking system 50 including items shown in FIG. 1. The swing arm 20 has a window 30 into which a locking rod 32 of the locking cylinder 24 is movable and from which it is retractable. A solenoid valve 34 controls the movement of the locking rod 32.

In certain embodiments, the solenoid valve 34 is powered by pneumatic or hydraulic fluid such as air, oil, or fuel supplied under pressure in a line 26. The solenoid valve 34 is vented through a vent line 36. Typically, in embodiments using air, air in the line 26 is supplied from a vehicular pneumatic brake system. A spring 38 normally forces the locking rod 32 out from the cylinder 24. Air under pressure flowing from the solenoid valve 34 into the cylinder 24 through a line 42 pushes on an internal piston 45 forcing the spring 38 up and moving the locking rod 32 upwardly —and out of the window 30 if it is disposed therein. The cylinder 24 is vented through a vent line 54. Lines 44 are electrical ground wires for the solenoid and GO light.

Preferably the mount plate 22 has a plurality of slightly oversize holes 56 to permit adjustable mounting of the cylinder 24 and solenoid valve 34 and related items so that the locking rod 32 is appropriately positioned with respect to an upper surface 56 of the swing arm 20 and with respect to the window 30.

FIG. 4A–4F show a swing arm 60 according to the present invention useful with transmissions and locking systems as described herein. The swing arm 60 is designed for movement under a locking rod such as the locking rod 32 which has some range of vertical movement against a spring (such as the spring 38) when a transmission shift shaft to which the swing arm is connected is moved. The numerals 1, 2, 3 on the swing arm 60, when positioned beneath the locking rod, indicate that the transmission is in a first, second, or third forward drive gear; the letter D indicates the transmission is in fourth forward drive gear; the letter N indicates the transmission is in neutral; and the letter R indicates the transmission is in reverse. A hole 62 provides for a welded collar 21 with a keyway for pivotal mounting of the swing arm 60 to a transmission selector shaft which has a keyed end corresponding to the shape of the keyway. Preferably a nut is threaded on the shaft to secure the arm in place. Alternatively the keyway is machined as an integral part of the arm. A top member 64 of the swing arm 60 is curved to accommodate the locking rod so that the locking rod moves on a top surface 66 of the top member 64 from the first gear indicating position to the reverse gear indicating position. One or more windows 68 are disposed in the top surface 66 into which the locking rod will move when it moves adjacent a window due to spring force on the locking rod. The spring constantly pre-loads the locking rod forcing it against the window upper surface so that it will move into the window (s). Shift lock will occur automatically when the spring is forcing the locking rod outwardly from its cylinder. If the spring has been compressed (e.g. due to air or hydraulic fluid or by energizing of an electrical solenoid coil), the locking rod will be retracted and an operator will be able to freely shift the transmission from one gear to another.

FIG. 5 illustrates an electrically controlled pneumatic actuator transmission locking system 70 according to the present invention. A vehicle V has a source of air under pressure for supplying air to air brakes 81. An air brake pedal 77 is interconnected to a brake air application line 78 which in turn is in fluid communication with an air supply "T" 79. Air flows to the air brakes through lines 80. Other items in the system 70 are like the items in FIGS. 2, 3 and bear the same identifying numerals.

A key electrical switch 71 must be in an "ON" position for the locking system 70 to function (i.e., if the switch is not "ON" the transmission is locked and the locking rod 32 can not be withdrawn from the window 30). With the switch 71 in the "ON" position, an in-cab light (or audio signaller) 72 is powered and power is provided to the solenoid valve 34. The solenoid valve may be viewed as an opened or closed door allowing or prohibiting pressurized fluid into the cylinder. Both the solenoid valve 34 and the light 72 are grounded via the pressure switch 46 and via a ground line 76. Grounding occurs when adequate air pressure from the brake pedal line 78 is applied to the pressure switch 46 through the line 78, "T" 79, line 26, and "T" 48. This same air pressure is applied through the line 52 to the solenoid valve 34 and the cylinder 24, immediately retracting the locking rod 32 from the window of the swing arm, freeing the transmission selector shaft for shifting when adequate air pressure is applied. When the air pressure is lowered to the point that again opens the pressure switch 46, thus breaking ground, the light 72 goes out (or the audio signal ceases), the solenoid valve 34 closes, and air within the cylinder 24 exhausts through the solenoid vent line 36. (In certain aspects the lowered air pressure point corresponds to not stepping hard enough on the brake pedal or to releasing the brake pedal. Typically the pressure switch opens and closes within a range of about one p.s.i. either way, i.e., it closes at 40 p.s.i. and opens at 39 p.s.i. when set to operate at 40 p.s.i. Certain vehicles, however, operate at other pressures, e.g. about 30 p.s.i.) The moment the air pressure exhausts from the cylinder 24, the internal spring 38 forces the locking rod 32 out from the cylinder 24. The rod will not be retracted again until adequate air pressure from the brake pedal 77 is applied to the pressure switch 46 to open the solenoid 34.

FIG. 6 shows another aspect of the system 70 in which one or more optional electrical devices or switches 82, 83, 84 interrupt the flow of electrical power to the light 72 and to the solenoid 34. Preferably these switches and devices are opened for a "NO GO" condition (i.e., transmission remains locked) and closed for a "GO" condition (i.e., transmission is unlocked, shifting is possible). Until all of the switches and devices are in a closed "GO" condition, the light 72 does not light, the solenoid 34 does not open, and the locking rod 32 is not retracted from the window 30.

Figure 7:
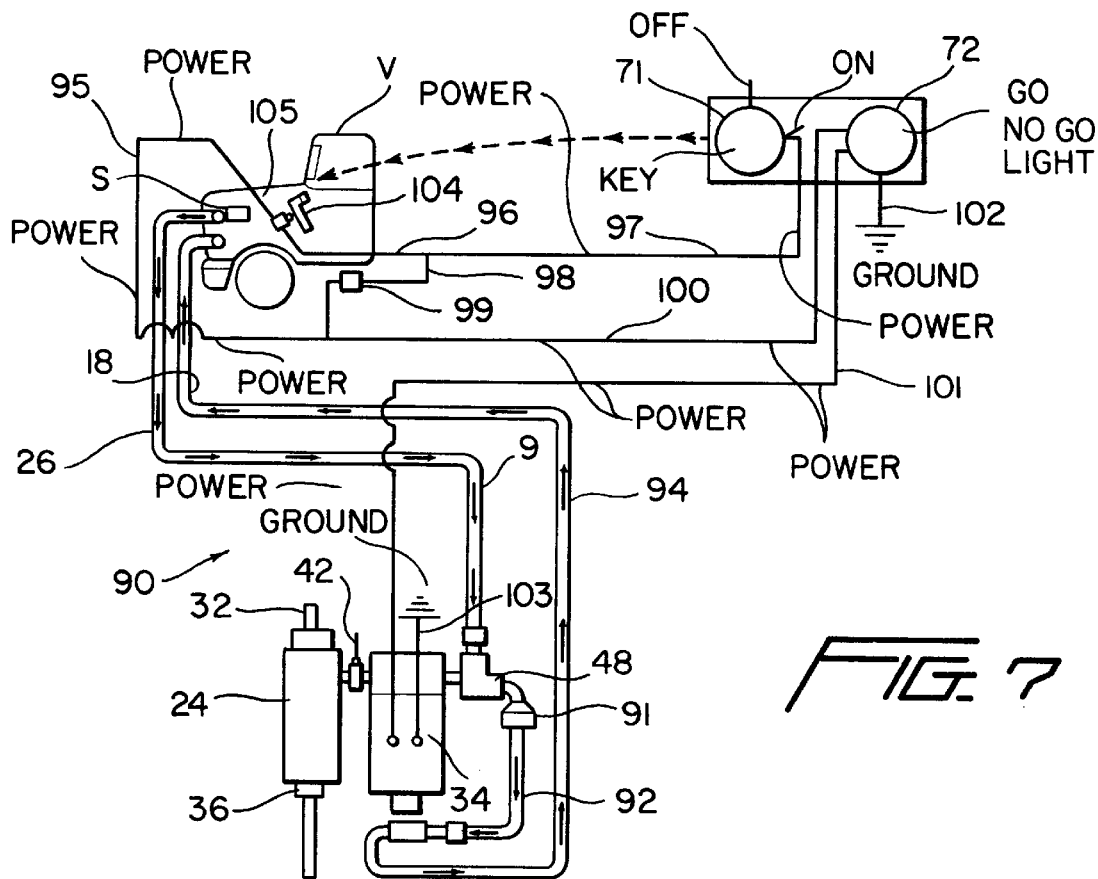
FIG. 7 is a schematic view of a hydraulic actuating system according to the present invention.

FIG. 7 shows an electrically controlled hydraulic actuator transmission locking system 90 according to the present invention. A vehicle V has a source S of fluid under pressure (e.g. source S provides pressurized engine oil, engine fuel, hydraulic fluid, power steering fluid, etc.). A switch 105 senses position of an hydraulic brake pedal 104 which is typically used to apply hydraulic vehicle brakes (not shown). The light 72 and the solenoid valve 34 are powered via lines 100 and 101 only when the switch 105 or devices 99 used to sense vehicle movement are closed and/or are allowing electricity to be transmitted to them; otherwise the transmission is locked. The light 72 via a ground line 102 and the solenoid valve 34 via the ground line 102 are permanently grounded to a chassis of the vehicle V. When the switch 105 and/or the devices 99 interpret movement of the vehicle V, electrical power ceases to flow to the solenoid valve 34 and to the light 72, the locking rod 32 is extended (or it remains extended) and the light 72 goes out. Whenever the light 72 is out, the locking rod 32 is extended, i.e. the transmission is locked or will lock as soon as the locking rod moves to the window 30. Electrical power to the normally opened brake position switch 105 will not flow through the switch until the brake pedal 104 is moved to a position that interprets zero vehicle movement. As long as the pedal 104 is held in that position, the switch 105 will close and allow electricity to power the solenoid 34 and light 72. If the engine or vehicle is producing above the minimum fluid pressure required through the line 26 to the solenoid then oil will pass through the solenoid valve 34 and into the cylinder 24 causing rod 32 to immediately fully retract. When the brake pedal 104 is moved away from the switch 105 far enough to cause the switch 105 to open, the green light 72 goes out, the solenoid valve 34 closes, and all fluid within the cylinder 24 exhausts through the solenoid exhaust port 36 into a non-pressurized oil return line 94. The moment the fluid pressure and fluid exhaust from the cylinder 24, the cylinder internal spring 38 forces the rod 32 to fully extend. The cylinder 24 will not retract again until the solenoid valve 34 again opens which only occurs when the brake pedal 104 is again moved to the position that interprets zero vehicle movement.

When vehicle movement is sensed with electrical devices 99, as long as the devices 99 sense non-movement, electricity flows through the devices 99 to power the solenoid valve 34 and light 72. If the engine or vehicle is producing above the required minimum fluid pressure at the solenoid valve inlet, the fluid passes through the solenoid 34 and into the cylinder 24 causing rod 32 to immediately fully retract. When the devices 99 sense vehicle movement, the devices 99 interrupt electrical flow to the solenoid valve 34 and green light 72, the green light 72 goes out, the solenoid valve 34 closes, and fluid within the cylinder 24 exhausts through the solenoid exhausts port 36 into the non-pressurized oil return line 94. The moment the fluid pressure and fluid exhausts from the cylinder 24, the cylinder internal spring forces the rod 32 to fully extend. The rod 32 will not retract again until the solenoid valve 34 again opens which only occurs when the devices 99 again interpret zero vehicle movement.

Figure 8:
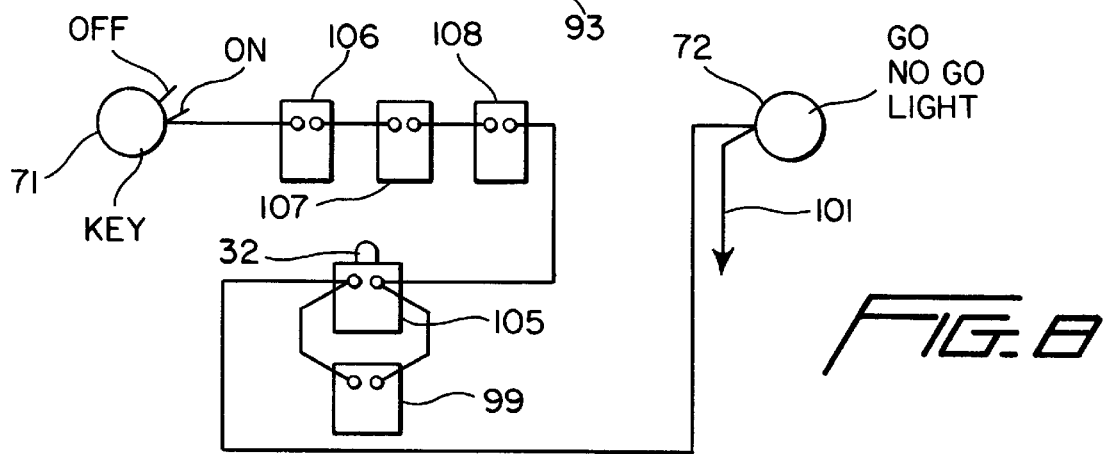
FIG. 8 is a schematic view of a hydraulic actuating system according to the present invention.

As shown in FIG. 8, electrical power to the light 72 (of the system of FIG. 7) and via the line 101, the solenoid valve 34 (shown in FIG. 7) may be interrupted by one or more optional electrical switches or devices 106, 107, 108.

Figure 9:
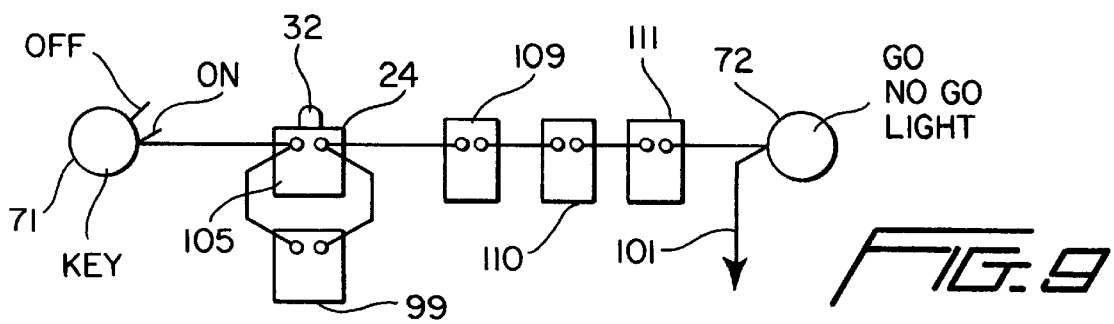
FIG. 9 is a schematic view of a hydraulic actuating system according to the present invention.

In one aspect these switches and devices are open for "NO GO" conditions and closed for "GO" conditions. Until all of the devices and switches are in a closed position, the light 72 is not illuminated, the solenoid valve 34 is not open, and the locking rod 34 will not retract. FIG. 8 shows interruption of power between the key switch 71 and the brake position electircal switch 105 or the vehicle movement-indicating devices 99. The switches and devices 82–84 and 106–108 may include (but are not limited to) a throttle position switch; a fuel pressure switch; a parking, brake position switch; a drive body position switch; an accessory component position or condition switch, etc. Insert a new paragraph at page 21, line 12:

As shown in FIG. 9, electrical power to the light 72 (of the system of FIG. 7) and via the line 101, the solenoid valve 34 (shown in FIG. 7) may be interrupted by one or more optional electrical switches or devices 109, 110, 111. In one aspect these switches and devices are open for "NO GO" conditions and closed for "GO" conditions. Until all of the devices and switches are in a closed position, the light 72 is not illuminated, the solenoid valve 34 is not open, and the locking rod 34 will not retract. FIG. 9 shows interruption of power between the switch 105 or the devices 99 (of the system of FIG. 7) and the light 72. The switches and devices 109–111 may include (but are not limited to) a throttle position switch; a fuel pressure switch; a parking brake position switch; a drive body position switch; an accessory component position or condition switch, etc.

Figure 10:
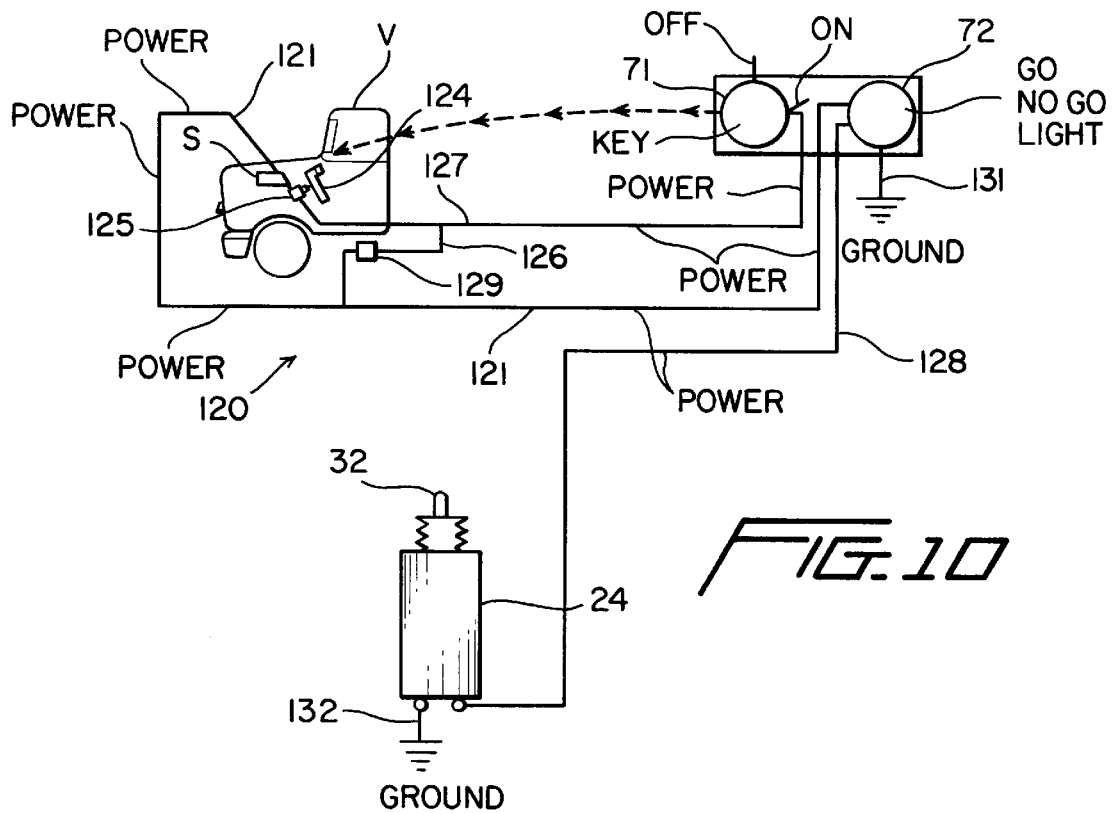
FIG. 10 is a schematic view of an electrical actuating system according to the present invention.

FIG. 10 shows an electrically controlled electrical actuator transmission locking system 120 according to the present invention. A vehicle V has an electrical power source S (e.g. battery, generator and/or alternator, a "hot" post of an ignition switch or any terminal or connector which is "hot" when the key is on) to which is connected a power line 121 and a keyed power switch 71. A brake position electrical switch 125 indicates and responds to the position of a brake pedal 124. Vehicle movement indicating devices 129 (like the previously-described devices 99) are in a line 126 between the line 121 and a line 127 from the switch 125 to a key switch 71. Power flows in a line 128 from a light 72 to the solenoid valve 34 which in this embodiment is an electrical solenoid. The light 72 is grounded to a chassis of the vehicle V via a line 131 and the solenoid 24 is similarly grounded with a line 132. In this embodiment the locking rod is retracted by energizing the solenoid coil and no separate solenoid valve is used apart from the electrical solenoid 24.

The key switch 71 must be turned to the ON position in order for the locking system 120 to function. A dash mounted green "GO/NO GO" light 72 and solenoid 24 are powered only when the brake position switch 125 or the electrical device(s) used to sense vehicle movement 129 are closed and/or allowing electricity to flow through them. When vehicle movement is interrupted by either the switch 125 or the device(s) 99 electricity to the light 72 and the solenoid 24 is interrupted causing the rod 32 to extend or remain extended and the green light 72 to go out. Whenever the green "GO/NO GO" light 72 is not illuminated, the rod 32 is fully extended in the locked position.

The device(s) 99 may include (but are not limited to) a brake pedal position switch, a speedometer signalling device, a drive shaft rotational device, a wheel movement sensing device, etc.

Power to the normally opened brake position switch 125 does not flow through the switch until the brake pedal 124 is moved to a position that interprets no vehicle movement. As long as the pedal 124 is held in that position, the switch 125 closes and electricity flows to power the solenoid 24 and light 72. When the brake pedal 124 is moved away from the switch 125 far enough to cause the switch to open, the green light 72 goes out and a return spring within the solenoid 24 forces the rod 32 to fully extend. The rod 32 does not retract until the solenoid 24 is again powered which only occurs when the brake pedal 124 is again moved to the position that interprets no vehicle movement.

When vehicle movement is sensed with electrical devices 129 used to indicate vehicle movement, as long as the devices sense non-movement, electricity flows through the devices to power the solenoid 24 and light 72. When the devices 129 sense vehicle movement, the devices interrupt electrical flow to the solenoid and green light 72. The green light 72 goes out, the solenoid deenergizes, and the rod 32 fully extends from the force of the solenoid spring. The rod 32 will not retract again until the solenoid is again energized which only occurs when the devices 129 again interpret no vehicle movement.

Figure 11:
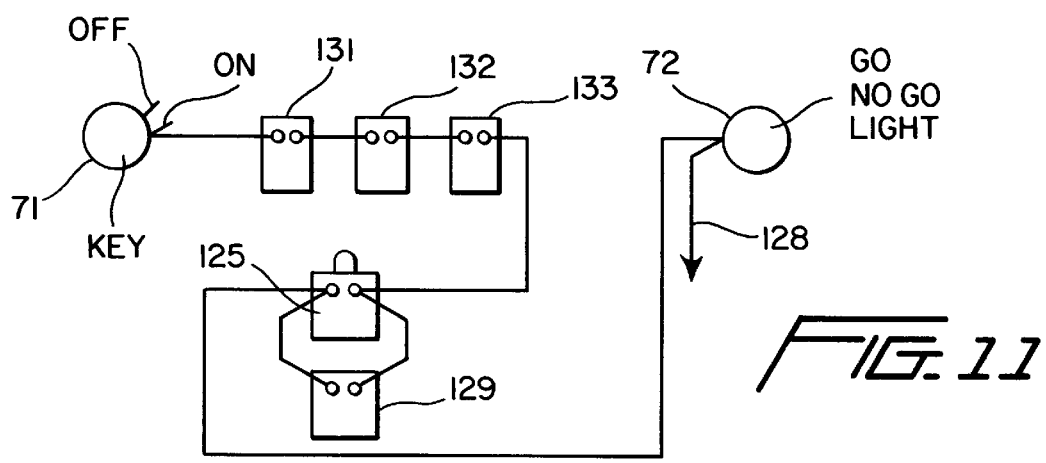
FIG. 11 is a schematic view of an electrical actuating system according to the present invention.
Figure 12:
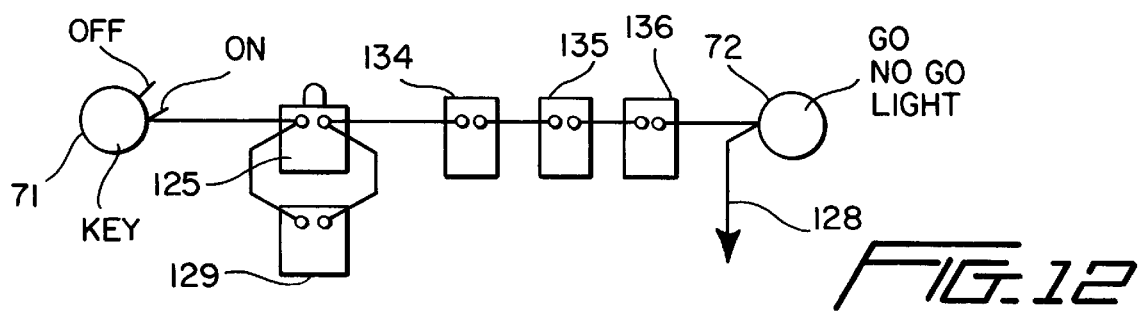
FIG. 12 is a schematic view of an electrical actuating system according to the present invention.

Electrical power to the light 72 and solenoid 24 can be interrupted by one or more optional electrical switches and/or devices 131, 132, 133 (FIG. 11 between the switch 71 and the switch 125 or the devices 129) or 134, 135, 136 (FIG. 12 between the switch 125 or devices 129 and the light 72). These switches and devices 129 are open for "NO GO" conditions and closed for "GO" conditions. Until all of the switches and devices 129 are in a closed position, the green light 72 will not illuminate, the solenoid will remain de-energized and the rod 32 will not retract.

Figure 13A:
FIG. 13A is a top view of a swing arm according to the present invention.
Figure 13B:
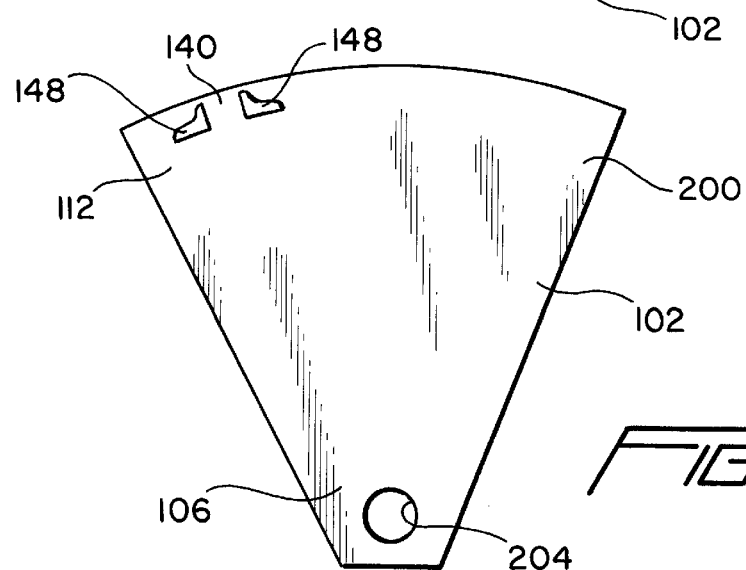
FIG. 13B is a side view of the swing arm of FIG. 13A.

A swing arm 200 as shown in FIGS. 13A and 13B according to the present invention has a main body 102 with a hole 204 at a lower end 106 for mounting on a transmission selector shaft. Two ramp blocks 148 secured at a top 112 of the body 102 define a capture space 140 in which a cylinder rod is releasably held (like the rod 32 previously described). Although only one ramp block may be used according to this invention, two are preferred.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A transmission locking system for selectively preventing shifting of a transmission, the transmission including internal gearing with a plurality of gears and manually-operable gear selection apparatus including a transmission selector shaft interconnected between a rod connected to a shifting handle in a vehicular cab of a vehicle having the transmission, the transmission locking system comprising a swing arm securable to the transmission, the swing arm having a top surface located above the transmission selector shaft so that the swing arm extends upwardly from the transmission selector shaft and is movable therewith, locking means with a body and a movable locking rod disposed above the top surface of the swing arm, capture means on the swing arm for receiving and holding the movable locking rod so that further movement of the swing arm is prevented and the transmission selector shaft is immobilized thereby preventing further shifting of the transmission, the capture means having a body, the movable locking rod movable with respect to the body of the capture means, solenoid means interconnected with the locking means for controlling movement of the movable locking rod and for selectively removing the movable locking rod from the capture means so that the transmission is again able to shift gears, and the movable locking rod biased and pre-loaded by a spring urging the movable locking rod outwardly from the body of the capture means so the movable locking rod bears continuously against the top surface of the swing arm as the swing arm moves under the movable locking rod so that the movable locking rod moves from above the capture means into the capture means when the capture means moves under and adjacent the movable locking rod.

2. The system of claim 1 further comprising control apparatus interconnected between the solenoid means and a power source for controlling the solenoid means.

3. The system of claim 2 wherein the control apparatus includes an ignition key switch which must be in an ON position for power to flow to the solenoid means to retract the movable locking rod from the capture means permitting gear shifting.

4. The system of claim 3 wherein the control apparatus further includes at least one vehicular status responsive switch which must be in an ON position for power to flow to the solenoid means to retract the movable locking rod from the capture means permitting gear shifting.

5. The system of claim 1 further comprising the capture means comprising a window in the top surface of the swing arm into which and out from which the movable locking rod is movable.

6. The system of claim 1 further comprising the capture means comprising two spaced-apart stop members, the movable locking rod movable so that it extends between the two spaced-apart stop members.

7. The system of claim 1 wherein the solenoid means comprises an electrical solenoid with a solenoid coil within which the movable locking rod is movably disposed, the movable locking rod moving in response to electrical current flow in the solenoid coil.

8. The system of claim 1 further comprising a visual indicating device in the vehicular cab interconnected with the solenoid means for giving a visual indication to a vehicle driver of the status of the movable locking rod.

9. A transmission locking system for selectively preventing shifting of a transmission, the transmission including internal gearing with a plurality of gears and manually-operable gear selection apparatus including a transmission selector shaft interconnected between a rod connected to a shifting handle in a vehicular cab of a vehicle having the transmission, the transmission locking system comprising a swing arm securable to the transmission selector shaft of a transmission so that the swing arm extends upwardly from the transmission selector shaft and is movable therewith, the swing arm having a top surface located above the transmission selector shaft, locking means with a body and a movable locking rod disposed above the top surface of the swing arm, capture means on the swing arm for receiving the movable locking rod so that further movement of the swing arm is prevented and the transmission selector shaft is immobilized thereby preventing further shifting of the transmission, the capture means having a body, the movable locking rod movable with respect to the body of the capture means, solenoid means interconnected with the locking means for controlling movement of the movable locking rod and for selectively removing the movable locking rod from the capture means, control apparatus interconnected between the solenoid means and a power source for controlling the solenoid means, the control apparatus including an ignition key switch which must be in an ON position for power to flow to the solenoid means to retract the movable locking rod from the capture means permitting gear shifting, the capture means having a window through the top surface of the swing arm for receiving and holding the movable locking rod, the movable locking rod biased and pre-loaded by a spring urging the movable locking rod outwardly from the body of the capture means so the movable locking rod bears continuously against the top surface of the swing arm as the swing arm moves under the movable locking rod so that the movable locking rod moves into the window when the window moves under and adjacent the movable locking rod, the solenoid means comprising an electrical solenoid with a solenoid coil within which the movable locking rod is movably disposed, the movable locking rod moving in response to electrical current flow in the solenoid coil.

10. A transmission system for a vehicle having a cab, the transmission system comprising a case, internal vehicle gearing with multiple gears mounted in the case, manually-operable gear selection apparatus including a selector shaft connected to a rod, a shifting handle connected to the rod, the shifting handle positionable in the cab of a vehicle, a transmission locking system, the transmission locking system comprising a swing arm secured to the transmission selector shaft, the swing arm extending upwardly from the transmission selector shift and movable therewith, the swing arm having a top surface located above the transmission selector shaft, locking means with a body and a movable locking rod disposed above the top surface of the swing arm, capture means on the swing arm for receiving the movable locking rod so that further movement of the swing arm is prevented and the transmission selector shaft is immobilized thereby preventing further shifting of the transmission, the capture means having a body, the movable locking rod movable with respect to the body of the capture means, solenoid means interconnected with the locking means for controlling movement of the movable locking rod and for selectively removing the movable locking rod from the capture means, control apparatus interconnected between the solenoid means and a power source for controlling the solenoid means, the capture means having a window through the top surface of the swing arm for receiving and holding the movable locking rod, the movable locking rod biased and pre-loaded by a spring urging the movable locking rod outwardly from the body of the capture means so the movable locking rod bears continuously against the top surface of the swing arm as the swing arm moves under the movable locking rod so that the movable locking rod moves into the window when the window moves under and adjacent the movable locking rod.

11. A swing arm for indication gear status of a transmission, the transmission having a gear selector shaft extending from a case enclosing internal gearing mechanism, the gear selector shaft movable to change gears of the transmission, a movable locking rod disposable above the swing arm, the swing arm comprising a body having a top surface, a hole in the body for mounting the swing arm to the gear selector shaft so that the body extends upwardly from the gear selector shaft, the top surface of the swing arm located above the hole so that the swing arm is located above the gear selector shaft, and capture means on the top surface of the swing arm for receiving from above the movable locking rod so that further movement of the swing arm is prevented and the gear selector shaft is immobilized thereby preventing further shifting of the transmission.

12. The swing arm of claim 11 further comprising the capture means having a window through the top surface of the swing arm for receiving and holding the movable locking rod.

* * * * *